G. A. & L. A. SCHLINGMANN.
DROP CATCHER FOR COFFEE POTS AND SIMILAR VESSELS.
APPLICATION FILED JAN. 17, 1913.
1,088,102.  Patented Feb. 24, 1914.
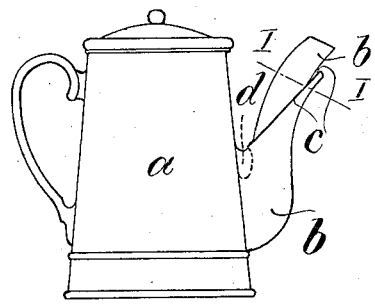
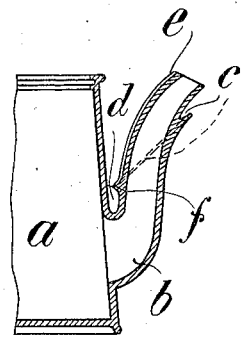
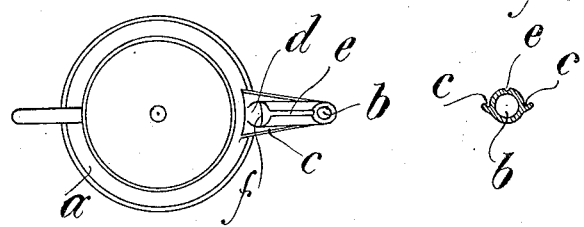
Witnesses:
Inventors.

UNITED STATES PATENT OFFICE.

GUSTAV ADOLF SCHLINGMANN AND LOUIS ADOLF SCHLINGMANN, OF BREMEN, GERMANY.

DROP-CATCHER FOR COFFEE-POTS AND SIMILAR VESSELS.

1,088,102.              Specification of Letters Patent.         Patented Feb. 24, 1914.

Application filed January 17, 1913. Serial No. 742,749.

*To all whom it may concern:*

Be it known that we, GUSTAV ADOLF SCHLINGMANN and LOUIS ADOLF SCHLINGMANN, both citizens of the free State of Bremen, residing at Bremen, Germany, have invented certain new and useful Improvements in Drop-Catchers for Coffee-Pots and Similar Vessels, of which the following is a specification.

This invention relates to a drop-catcher for coffee pots and similar vessels which has the shape of a gutter fixed to the spout and is made in one piece with the spout and the pot.

According to this invention the gutter is arranged at both sides of the spout, and provided at the rear with a drop-collector which is connected by a channel or groove with the front end of the spout so that the collected drops flow out when the pot is inclined very much to pour out the last remnant of its contents. The drop collector is separated from the channel or groove by a shoulder which retains the collected liquid when the pot is inclined in the usual manner.

The invention is shown in the accompanying drawings by way of example.

Figure 1 is a side elevation of a coffee pot provided with the collector. Fig. 2 is a partial vertical section through a coffee pot. Fig. 3 is a plan view. Fig. 4 is a cross section through the spout on line I—I of Fig. 1.

Under the spout $b$ of the coffee pot $a$ a gutter $c$ is arranged which terminates at the rear end in a drop-collector $d$ situated at the angle between the upper surface of the spout $b$ and the coffee pot $a$. In the upper surface of the spout $b$ a groove $e$ is arranged which extends from the drop-collector $d$ to the front end of the spout. A shoulder $f$ separates the lower end of the groove $e$ from said drop-collector $d$.

The device operates as follows:—The drops formed at the lower surface of the spout are caught by the gutter $c$ and conducted into the drop collector $d$. When the pot $a$ is inclined to pour out its contents the liquid from the drop-collector is prevented from flowing out by the shoulder which separates the drop collector from the groove $e$. If however the vessel is brought to an almost horizontal position for emptying it completely, the liquid from the drop-collector flows out through the groove $e$.

Having thus described our invention what we claim is:—

A drop-collector for coffee pots or similar objects comprising in combination with the spout of the vessel having a groove in its upper surface, a gutter arranged under said spout, a drop-collector between the spout and the vessel communicating with said gutter and a shoulder separating the drop-collector from said groove of the spout for retaining the liquid in the collector when the vessel is slightly inclined, substantially as described and shown and for the purpose set forth.

In witness whereof we have hereunto set our hands in the presence of two witnesses.

GUSTAV ADOLF SCHLINGMANN.
LOUIS ADOLF SCHLINGMANN.

Witnesses:
 WILHELM STRUSS,
 F. TIEMANN.

---

Copies of this patent may be obtained for five cents each, by addressing the "Commissioner of Patents, Washington, D. C."